United States Patent [19]
Nishida et al.

[11] Patent Number: 4,577,324
[45] Date of Patent: Mar. 18, 1986

[54] HIGH POWER OUTPUT LASER APPARATUS

[75] Inventors: Naoto Nishida, Yokohama; Tadashi Takahashi, Tokyo; Katsuyuki Kakizaki, Yokohama, all of Japan

[73] Assignee: Kabushiki Kaisha Toshiba, Japan

[21] Appl. No.: 615,335

[22] Filed: May 30, 1984

[30] Foreign Application Priority Data

May 31, 1983 [JP] Japan .................................. 58-94805

[51] Int. Cl.$^4$ .............................................. H01S 3/08
[52] U.S. Cl. ..................................... 372/95; 372/108; 372/99; 372/92; 350/602
[58] Field of Search ................ 372/95, 108, 107, 98, 372/99, 92, 103; 350/602, 615, 617, 622, 634

[56] References Cited

U.S. PATENT DOCUMENTS 4,361,889  11/1982  Johnson et al. ....................... 372/95

OTHER PUBLICATIONS

Brochure entitled "CO$_2$ High Performance–Lasersystems", dated Jun. 27–Jul. 1, 1983.
J. Thomas Cox et al., "Highly Efficient Reflection-Type Polarizers for 10.6-μm CO$_2$ Laser Radiation Using Aluminum Oxide Coated Aluminum Mirrors", *Applied Optics*, vol. 17, No. 11, Jun. 1, 1978, pp. 1657–1658.
Roper, "The Use of Confocal Unstable Resonators in a Double Rogawski TEA CO$_2$ Laser", *Optics & Laser Tech.*, Feb. 1976.
Paxton et al., "Annular Converging-Wave Resonator: New Insights", *Opt. Lett.*, vol. 1, p. 166, No. 5, Nov. 1977.

*Primary Examiner*—Léon Scott, Jr.
*Attorney, Agent, or Firm*—Banner, Birch, McKie & Beckett

[57] ABSTRACT

A laser oscillator apparatus is disclosed having a laser medium flowing in one direction in a chamber, an unstable resonator including a concave mirror and a convex mirror that face each other in order to generate a laser beam transmitted in a direction perpendicular to the direction of flow of the laser medium, an output window provided in the chamber and rotation means for rotating the laser beam provided between the unstable resonator and the output window.

6 Claims, 8 Drawing Figures

HIGH POWER OUTPUT LASER APPARATUS

BACKGROND OF THE INVENTION

The present invention relates generally to a laser oscillator apparatus, and more particularly, is directed to a high output power gas laser using carbon dioxide as a laser medium.

In order to increase the output power of a laser, it is common practice to employ an unstable rather than a stable resonator as the laser oscillator. One reason for this is that a stable resonator generally uses a partially transparent mirror of zinc selenide (ZnSe) for coupling laser beam energy from the resonator to the output mirror. The intensity of the beam inside the resonator is always higher than the intensity of the beam output from the laser. The output mirror is, therefore, exposed to the elevated internal level of power rather than the lower level laser output beam. The maximum output power of the laser is, therefore, determined by the high power limit of the output mirror.

In laser oscillators which employ an unstable resonator, the combination of a coupling mirror made of metal and a totally transparent window are used in place of a partially transparent coupling mirror and an output mirror. The window in this case is exposed to the same power as the output power and the coupling mirror made of metal is much stronger than one made of transparent material. Therefore, the unstable resonator can handle more power than the stable resonator. In many cases, the output power of a high power laser is limited by the thermal distortion or decliniation of the transmitting optical element used in the laser. Thus, it is common practice in the prior art to employ an unstable resonator to increase the output power of the laser beam.

FIG. 1 shows a laser oscillator apparatus using an unstable resonator. The unstable resontar, which is positioned in a chamber 1, comprises an energizing portion 2 a circular convex mirror 3 and a circular concave mirror 4 facing each other. An annular coupling mirror 5 is inserted between mirror 3 and mirror 4 in order to reflex the laser beam L through output window 6. The configuration of the laser spot generated in the unstable resonator is tubular as designated by reference No. 7 in FIG. 1. In an unstable resonator, a metal mirror can be used for mirrors 3 and 4. Thus, it is possible to generate a laser beam with an output power of more than several x 10 kW in the energizing portion 2. However, the permissible maximum output power of the laser beam is about 20 kW because the laser beam must pass through output window 6 made of ZnSe. Output window 6 made of a material such as ZnSe is deformed or is broken by the laser beam at high output power. Thus, the output power laser must be maintained low.

SUMMARY OF THE INVENTION

It is, therefore, an object of the present invention to provide a laser oscillator apparatus which can generate a high power laser beam.

It is further object of the present invention to provide a laser oscillator which uses an unstable resonator to generate a laser beam with a symmetrical intensity distribution.

It is still further object of the present invention to provide a laser oscillator apparatus which can generate a laser beam suitable for laser processing.

The aforementioned objects are attained in accordance with the present invention by using a rotation means for rotating the laser beam transmitted toward the output window. One aspect of the invention comprises a laser medium flowing in one direction in a chamber. An unstable resonator is provided in the chamber having a first mirror with a concave reflecting surface and a second mirror with a convex reflecting surface. Both of the reflecting sufaces of the mirrors face each other in order to generate a laser beam which is transmitted in a direction perpendicular to the flowing direction of the laser medium. An output window is also provided in the chamber in order to output the laser beam. Rotation means are included in the chamber for rotating the laser beam transmitted toward the output window.

In the conventional laser oscillator apparatus using the unstable resonator shown in FIG. 1, it is difficult to equalize the intensity distribution of the laser beam generated in the unstable resonator in comparison with a multimode laser beam generated in a stable resonator. The intensity distribution of the laser beam generated in an unstable resonator tends to lose its symmetry of intensity distribution about the light axis as shown in FIG. 2. A laser beam with an asymmetrical intensity distribution causes a severe thermal deformation and a severe optical distortion of the output window, and finally, it destroys the output window. Further, a laser beam with an asymmetrical intensity distribution can not focus its energy to a small area and it is not suitable for laser processing. However, in accordance with the present invention, rotation means is provided for rotating the laser beam and thus equalizing its intensity distribution. Thus, the laser oscillator apparatus can generate a high power laser beam without breaking the output window.

DETAILED DESCRIPTION OF THE PREFERRED EMBODIMENT

Figure 1:
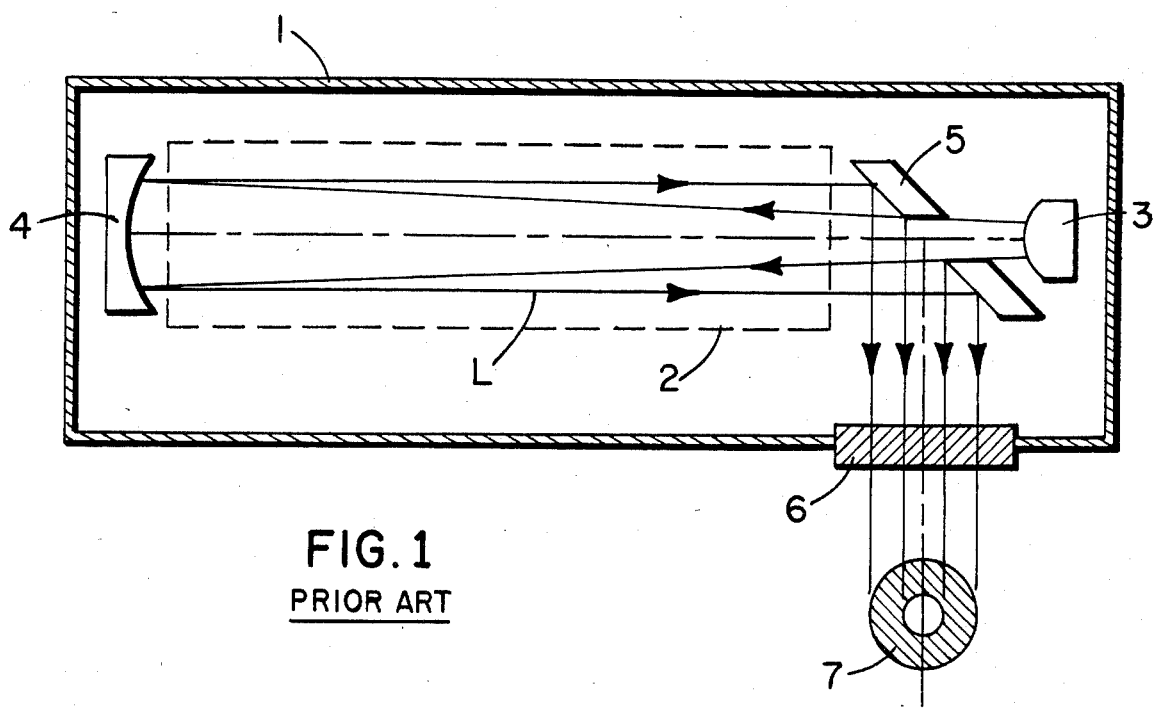
FIG. 1 is a sectional view of a conventional laser oscillator apparatus using an unstable resontar.
Figure 2:
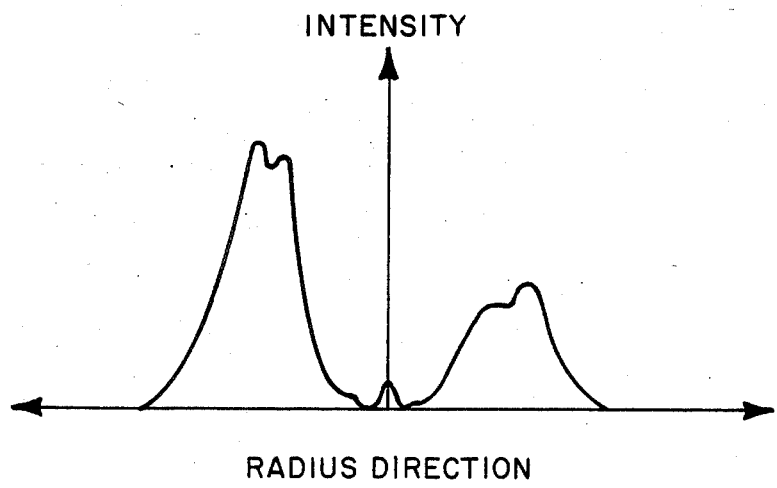
FIG. 2 is a graph showing the strength distribution of the laser beam generated by the laser osciallator apparatus shown in FIG. 1.
Figure 3:
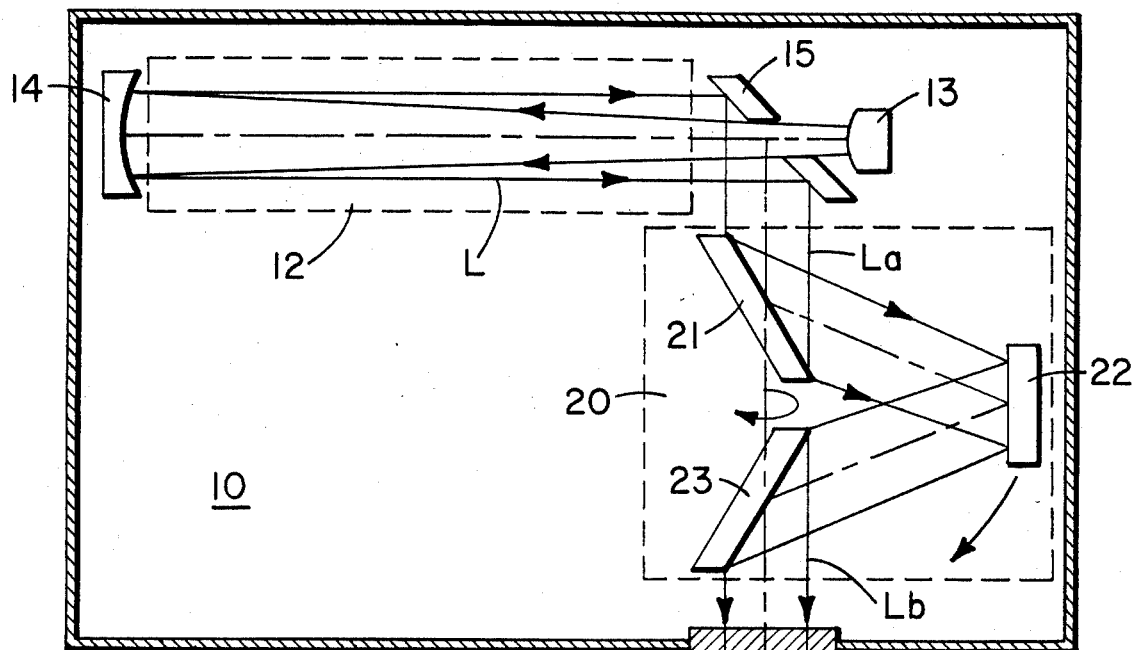
FIG. 3 is a sectional view of one embodiment of the invention.

Referring to FIG. 3, one preferred embodiment of the invention is explained as follows. In FIG. 3, a laser oscillator apparatus 10 has an unstable resonator in a chamber 11. Chamber 11 is airtight in order to keep a mixture of gases containing carbon dioxide inside and to maintain a discharge between an anode and a cathode (not shown) under a predetermined gas pressure. The unstable resonator includes an energizing portion 12, circular convex mirror or reflective surface 13 and a circular concave mirror or reflective surface 14 facing each other. Further, an annular coupling mirror 15 is inserted between the convex and concave mirror 13, 14 in order to transmit laser beam L through an output window 16 made of zinc selenide.

An optical rotator 20 is provided between the coupling mirror 15 and the output window 16. The optical rotator 20 comprises first, second, and third mirrors 21, 22 and 23. The first and third mirrors 21, 23 are arranged in a coaxial relationship i.e., they have the same central axis. The second mirror 22 is placed so that second mirror 22 can reflect the annular laser beam La (which is transmitted from coupling mirror 15 toward the output window 16 and is reflected by first mirror 21) to third mirror 23. Thus, laser beam Lb, which is in coaxial relationship with the laser beam La, passes through output window 16 such that laser beam Lb has an equalized intensity distribution in the plane of the laser spot by passing through optical rotator 20.

Figure 4:
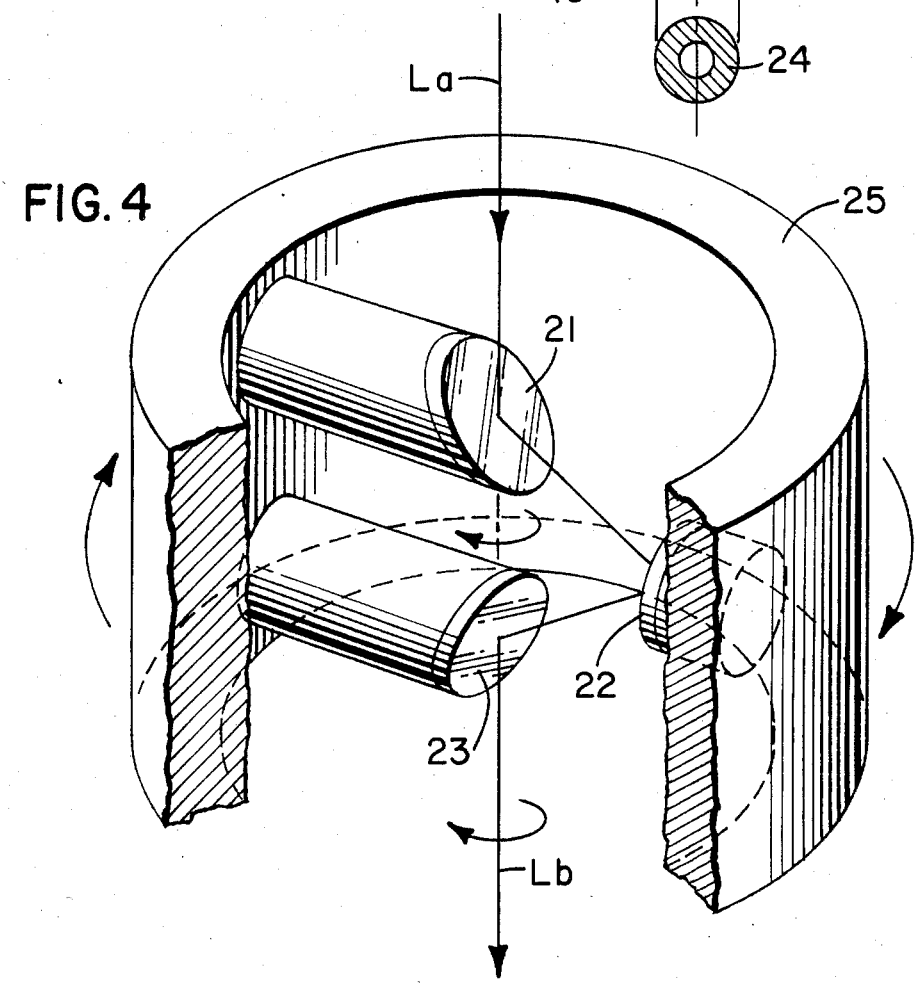
FIG. 4 is a perspective view of an optical rotator in accordance with the invention.

Optical rotator 20 is explained in detail hereafter. Referring to FIG. 4, first and third mirrors 21, 23 are attached to a cylindrical holder 24 in order to maintain the coaxial relationship explained above. Holder 24, with an axis coincident with the axis of the laser beam La, is rotated by a driving apparatus (not shown).

Figure 5:
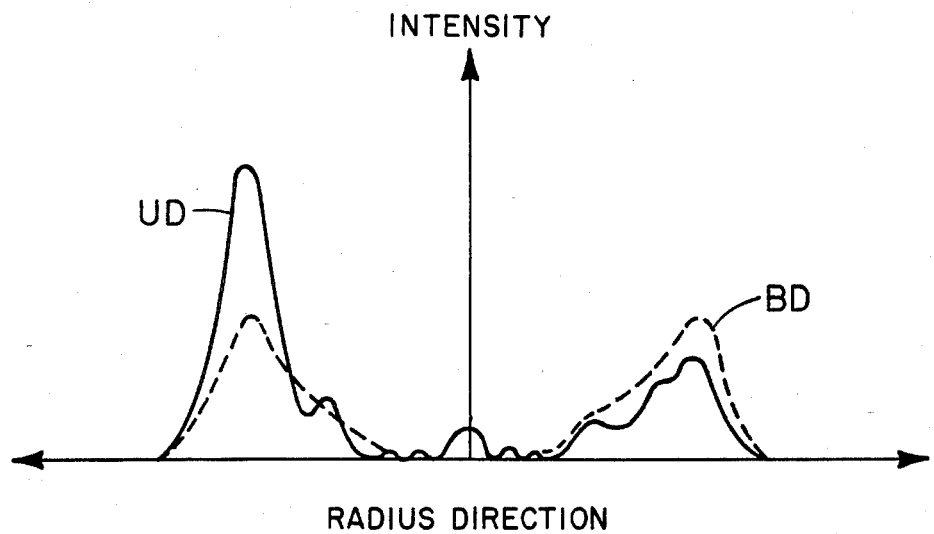
FIG. 5 is a graph showing the strength distribution of the laser beam generated by the laser oscillator apparatus of this invention.

When holder 24 turns, laser beam La is transmitted from first mirror 21 to third mirror 23 via second mirror 22 while rotating around the beam axis. Thus, laser beam Lb with an equalized intensity distribution is produced. Laser beam Lb rotates twice while holder 24 rotates once. Laser beam La with an unequalized intensity distribution UD shown in FIG. 5 is changed into laser beam Lb with an equalized symmetrical intensity distribution BD shown in FIG. 5.

Figure 6:
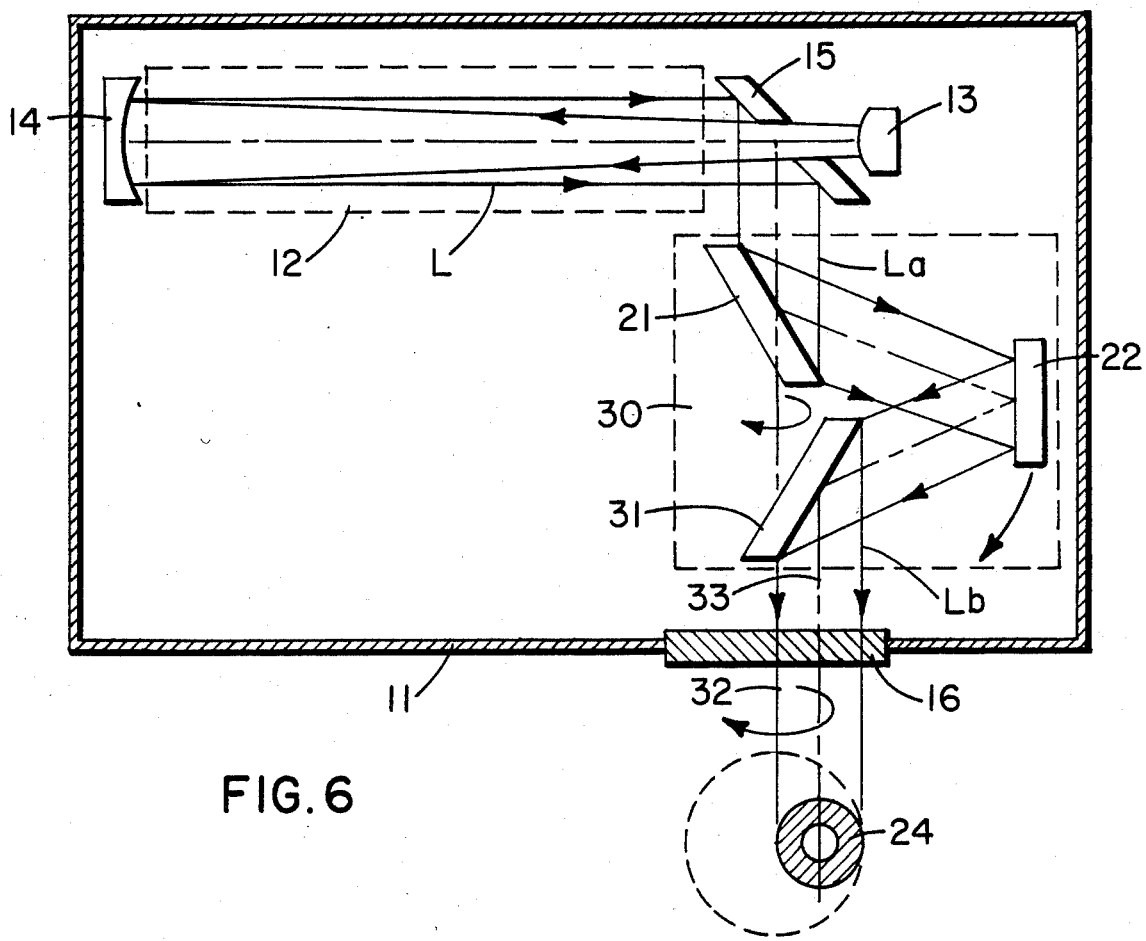
FIG. 6 is a sectional view of another embodiment of the invention.
Figure 7:
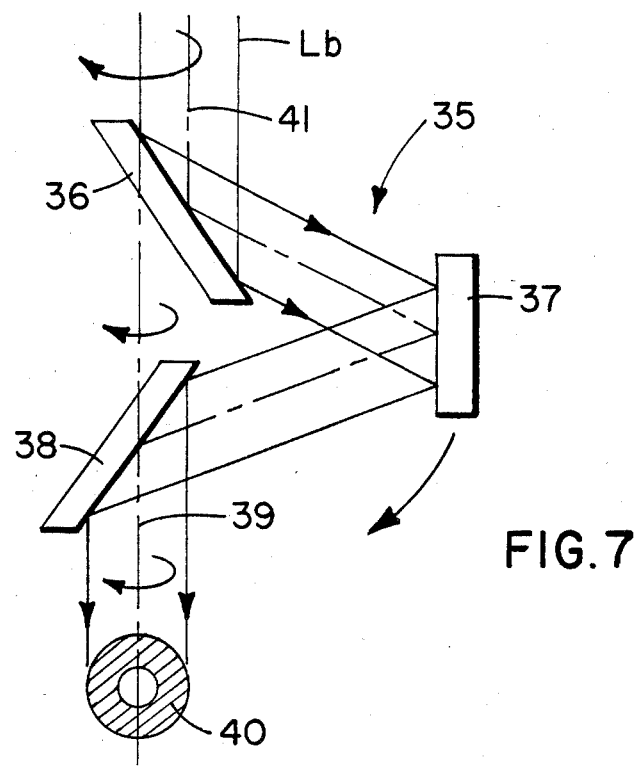
FIG. 7 is a sectional view of a further embodiment of the invention.

Another embodiment of the invention is shown in FIG. 6. In FIG. 6, the same elements shown in FIG. 4 are designated by the same reference numbers and operate in the same manner as explained above. Therefore, a discussion of these elements will not be repeated. In optical rotator 30 of this embodiment, the third mirror 31 is placed eccentrically to the axis of rotation. Because the beam spot size of the laser beam Lb is effectively enlarged as designated by dotted line by rotation of the beam spot 24, the intensity distribution of the laser beam at output window 16 is averaged out and its peak intensity is decreased. Thus, a laser beam with a high level of power may pass through the output window without excessive distortion and deformation of the output window. In this embodiment, the beam spot of the laser beam moves around. This movement may be stopped by providing an additional optical rotator 35 shown in FIG. 7, outside the output window. Specifically, optical rotator 35 has fourth, fifth, and sixth mirrors 36, 37, and 38 arranged in the same relationship as optical rotator 30 shown in FIG. 6. In the case of rotator 35, however, laser beam Lb through output window 16 is transmitted to fourth mirror 36, which is eccentric to the axis of rotation of the rotator. Rotator 35 is so positioned that rotation axis 39 of rotator 35 coincides with rotation axis 32 of rotator 30 and rotator 35 should by synchronized with rotator 30. Thus, stationary laser beam spot 40 is obtained. In this situation (as explained above), the central axis 41 of the fourth mirror 36 coincides with the central axis 33 of the third mirror 31, and the central axes 32, 39 of the first mirror 21 and the sixth mirror 38 coincide with each other.

Figure 8:
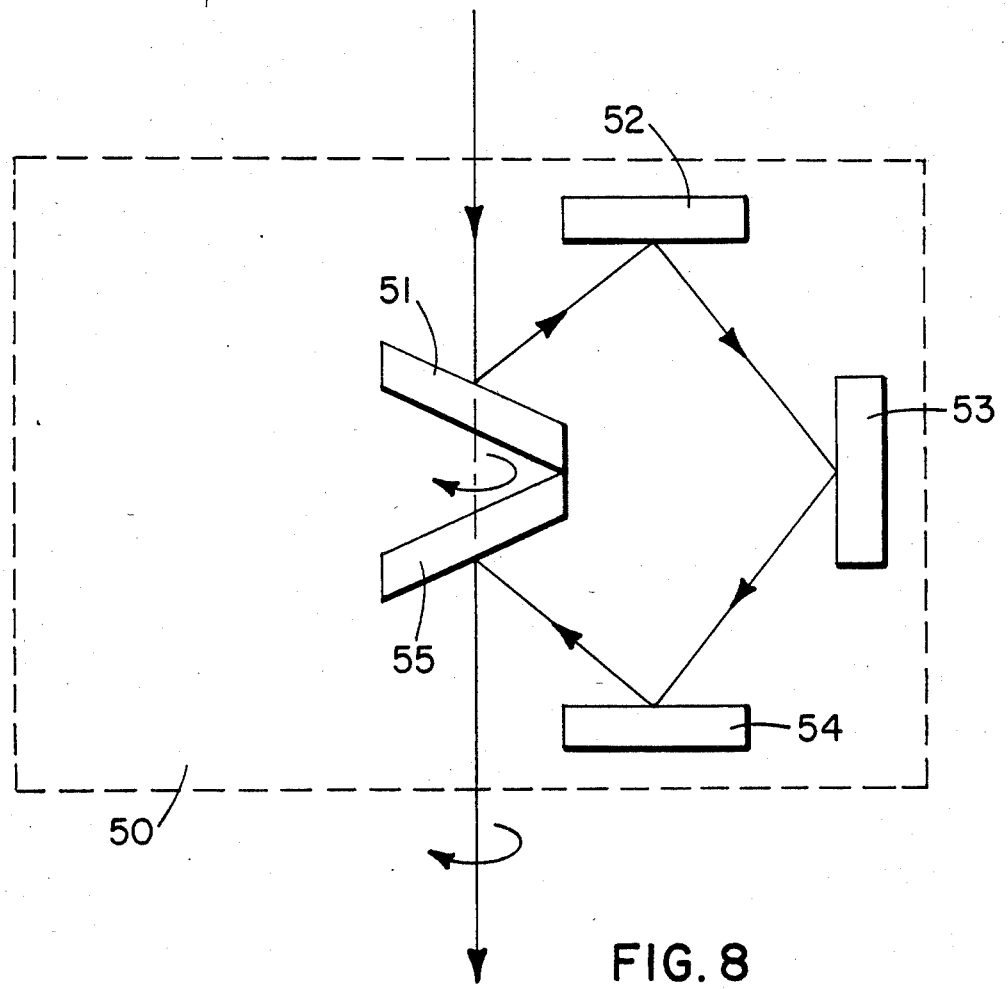
FIG. 8 is a sectional view of a still further embodiment of the invention.

In FIG. 8, another embodiment of a rotor is shown. In this embodiment, rotator 50 includes five mirrors 51, 52, 53, 54, and 55. Rotator 50 is compact as compared with the rotator shown in FIGS. 3 and 6 because first mirror 51 and fifth mirror 55 may be placed in close proximity to each other.

Because the time constant of thermal deformation or thermal distortion of an output window made of a material such as zinc selenide is on the order of one second, the intensity distribution of the laser beam may be equalized for the output window by rotating the optical rotator of the invention at a speed faster than a few resolution per second. Therefore, the invention has the following advantages:

(1) The laser oscillator apparatus of the invention can prevent the thermal deformation or thermal distortion of the output window.

(2) The laser oscillator apparatus of the invention can transmit a laser beam having a higher power.

(3) The laser oscillator apparatus of the invention can transmit a laser beam having an equalized intensity distribution suitable for laser processing.

Other variations and modifications will be aparent to those skilled in the art without departing from the true spirit and scope of the invention, which is to be limited only by the appended claims.

We claim:

1. A laser oscillator apparatus comprising:
   a laser medium flowing in one direction in a chamber;
   an unstable resonator including a first mirror with a concave reflecting surface and second mirror with a convex reflecting surface, both of said reflecting surfaces facing each other in order to generate a laser beam transmitted in a direction perpendicular to the flowing direction of the laser medium; and
   an output window provided in the chamber for the laser beam, and rotation means for rotating the laser beam disposed between the unstable resonator and the output window.

2. A laser oscillator apparatus according to claim 1 further comprising a coupling mirror with an aperture disposed between said first and second mirrors for changing the advance direction of the laser.

3. A laser oscillator apparatus according to claim 1 wherein the rotation means comprises metal mirrors.

4. A laser oscillator according to claim 1 wherein the rotation means comprises an odd number of reflecting surfaces.

5. A laser oscillator apparatus according to claim 4 wherein the first mirror receiving the laser beam from the resonator and the last mirror reflecting the laser beam toward the output window are so arranged that the axis of rotation of both the first and the last mirrors coincide with each other.

6. A laser oscillator apparatus according to claim 4 wherein the first mirror receiving the laser beam from the resonator and the last mirror reflecting the laser beam toward the output window are so arranged that the axis of rotation of the first mirror does not coincide with that of the last mirror.

* * * * *